Sept. 1, 1931.  G. A. VICHERD  1,821,594
MACHINE FOR CUTTING GROOVES IN SHOE HEELS
Filed Sept. 5, 1929    4 Sheets-Sheet 1
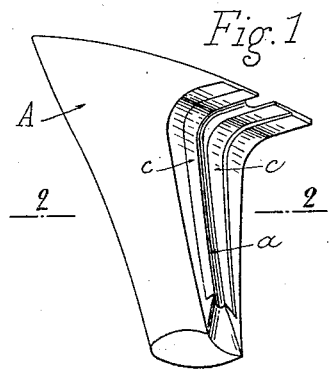
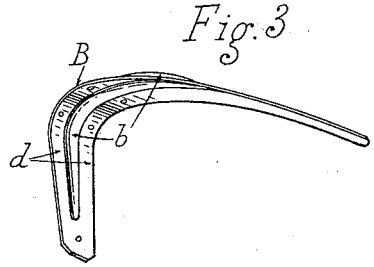
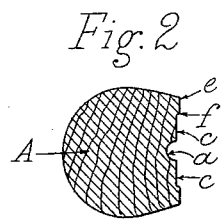
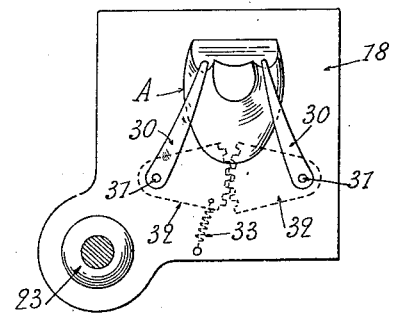
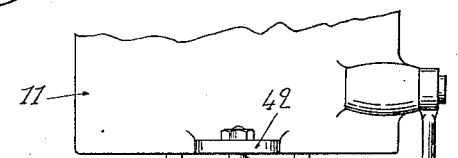
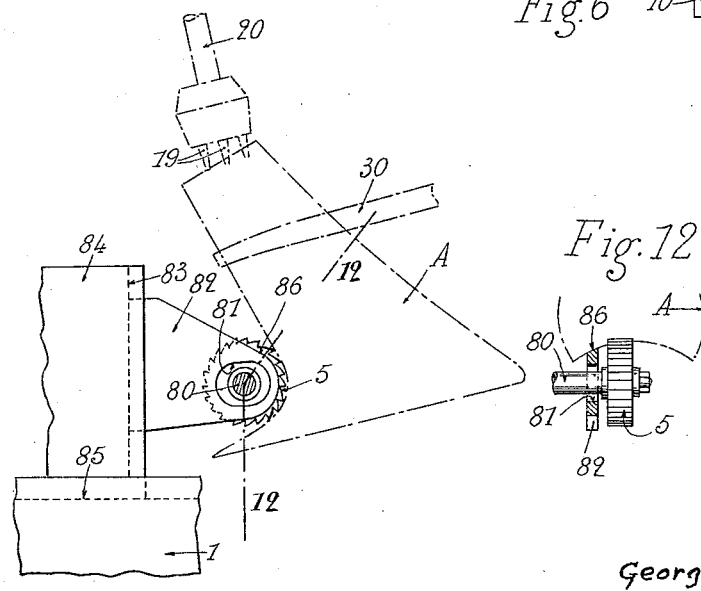
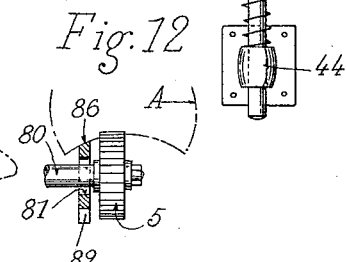
Inventor
Georges Adolphe Vicherd
By John J. Thompson
Attorney

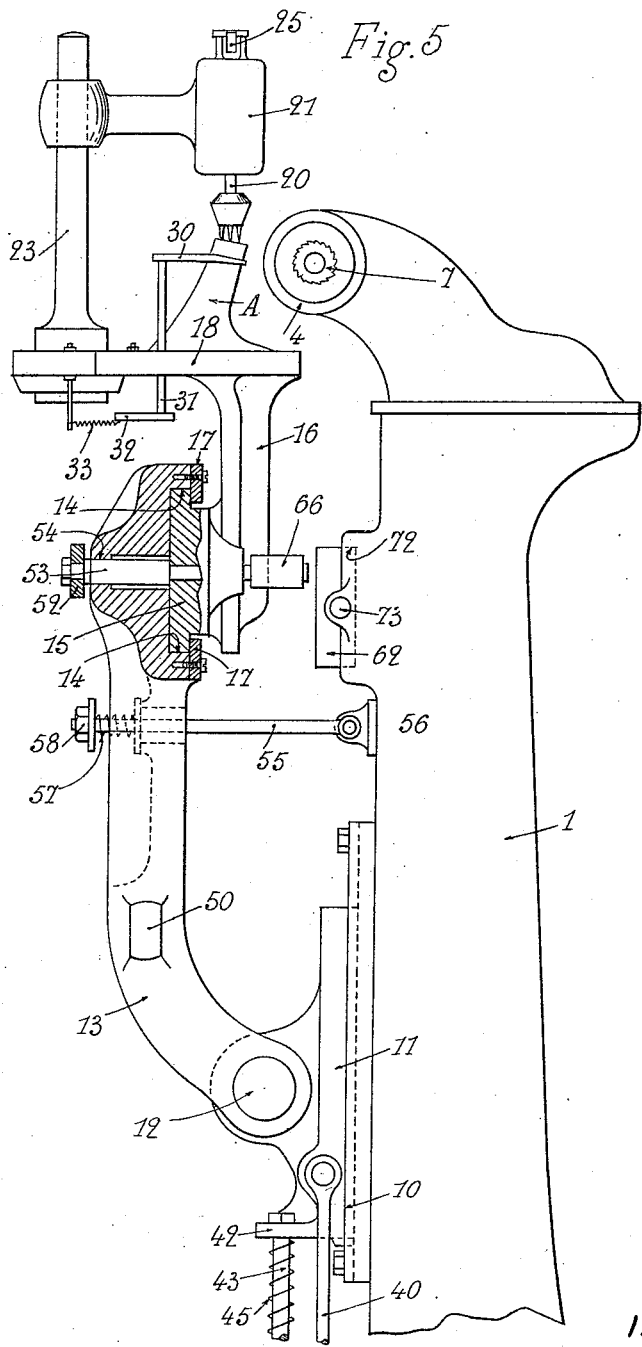

Sept. 1, 1931.  G. A. VICHERD  1,821,594
MACHINE FOR CUTTING GROOVES IN SHOE HEELS
Filed Sept. 5, 1929  4 Sheets-Sheet 4
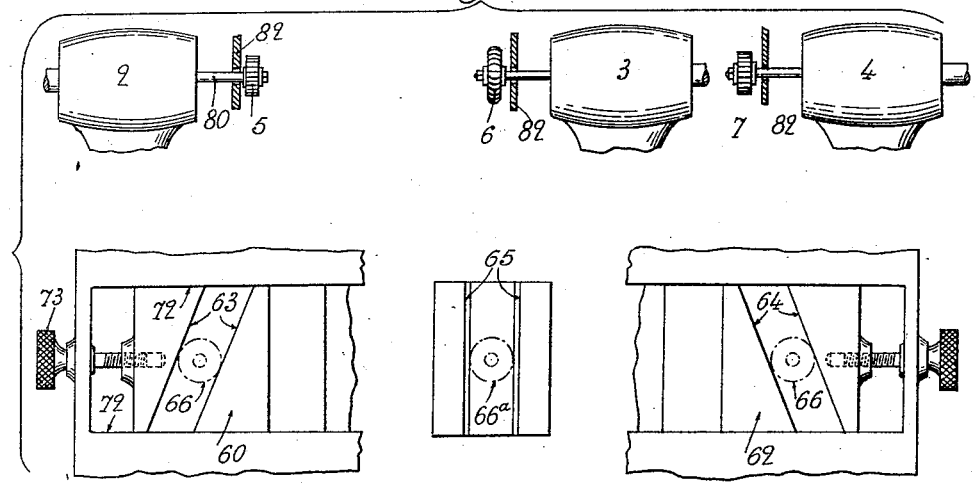
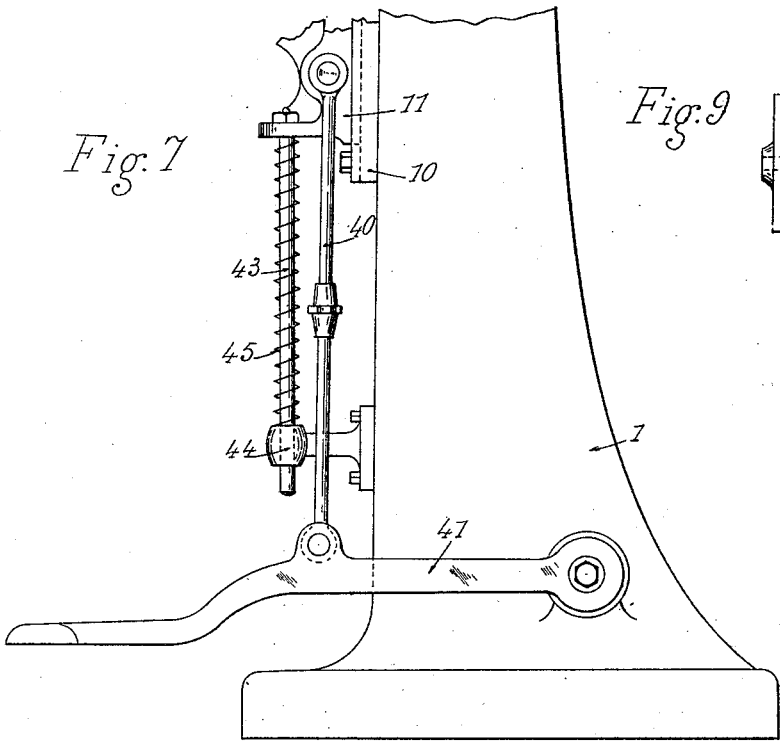
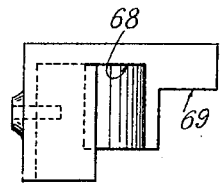
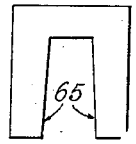
Inventor
Georges Adolphe Vicherd
By John J. Thompson
Attorney Patented Sept. 1, 1931

1,821,594

UNITED STATES PATENT OFFICE

GEORGES ADOLPHE VICHERD, OF PARIS, FRANCE, ASSIGNOR TO LARCO DEL VALLE & CIE., OF PARIS, FRANCE, A FRENCH COMPANY

MACHINE FOR CUTTING GROOVES IN SHOE HEELS

Application filed September 5, 1929, Serial No. 390,501, and in France September 12, 1928.

To prevent the loosening of the heels of ladies' shoes, and especially for very high heels, it is advantageous to secure a strengthening curved metal fitting to the front face of the heel and to the sole. Said fitting, which is usually formed with a central rib, is inserted into a recess formed in the front face of the heel. Such recesses in the heels have been hitherto cut by hand, thus requiring specially skilled labour, and this operation also represented a loss of time and a great waste of material.

The present invention has for its object to provide a machine adapted for cutting recesses or grooves in the face of wooden or other heels of this class, in such manner that the said fittings may be properly inserted. Another object of the invention is to devise a machine of this kind which comprises various means of adjustment whereby the size and shape of the recesses or grooves will correspond to the dimensions of the heels and of the metal fittings employed.

The accompanying drawings show by way of example the construction of a machine adapted for this purpose, as well as a type of heel which is to be machined thereon, and the corresponding metal fitting.

Fig. 1 is a perspective view of a heel whose front face is cut out for the insertion of a strengthening fitting.

Fig. 2 is a section on the line 2—2 of Figure 1.

Fig. 3 is a perspective view of a fitting employed with the heel represented in Figure 1.

Fig. 5 is a corresponding side view, with parts broken away.

Fig. 6 is a more or less diagrammatic elevational view of the lower part of the machine shown in Figure 4.

Fig. 7 is a corresponding side view.

Fig. 8 is a diagrammatic elevational view of the unit comprising the three milling cutters and the three guiding members with inclined slots for the heel carrying bracket.

Fig. 9 is a plan view of the left hand guiding member.

Fig. 10 is a plan view of the central guiding member.

Fig. 11 is a diagrammatic side view showing one of the lateral cutters and the corresponding cutter-guide.

Fig. 12 is a section on the line 12—12 of Figure 11 and,

Fig. 13 is a diagrammatic plan view of the heel supporting plate.

Figure 4:
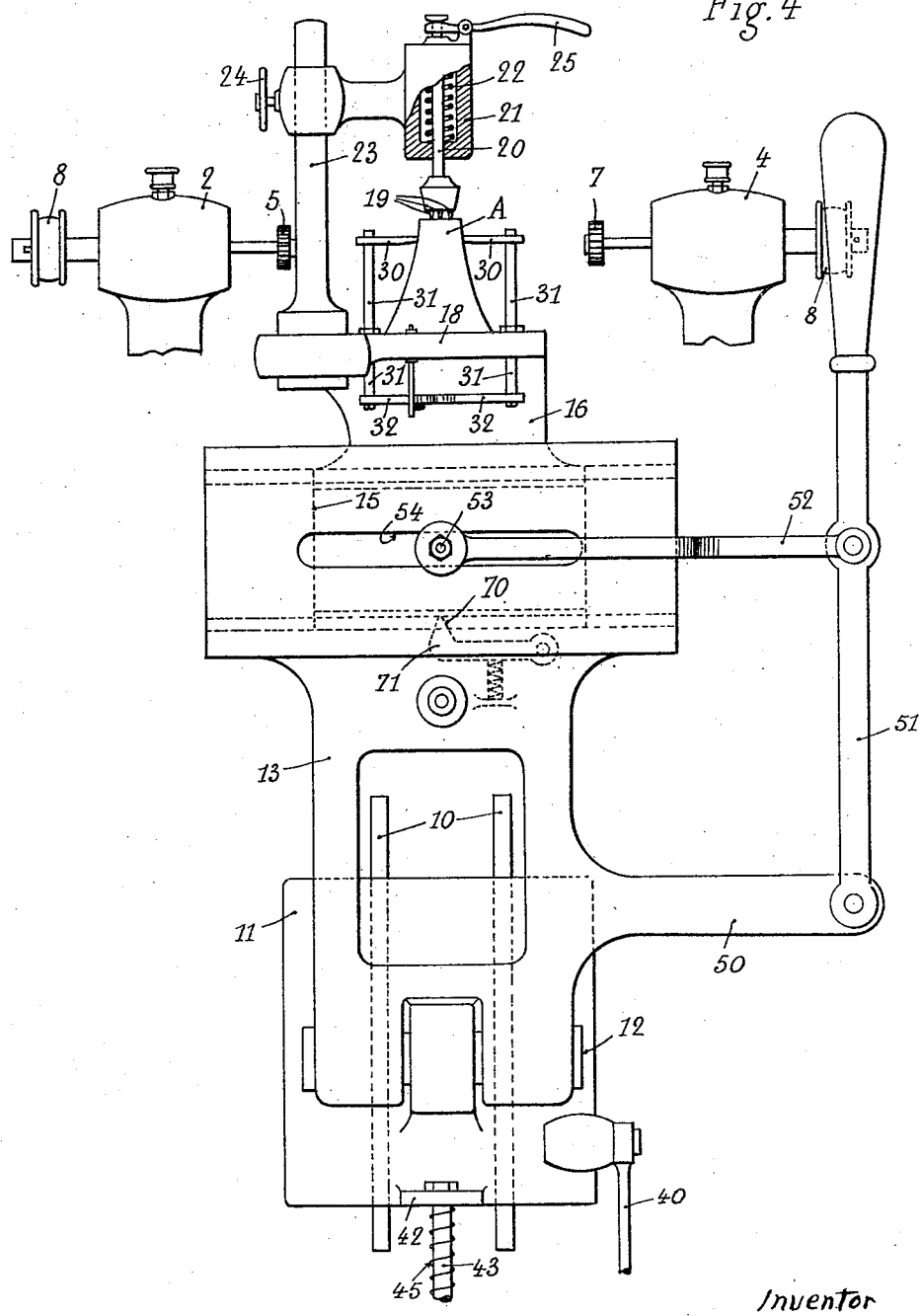
Fig. 4 is a more or less diagrammatic elevational view, with parts broken away, of the upper part of the machine according to the invention, with the pedal in the lower position.

As shown in Figures 1 to 3, A is the heel and B the metal fitting; in order to insert the strengthening metal fitting B into the front face of the heel A, it is necessary to cut in said front face a central groove $a$ corresponding to the rib $b$ of the said fitting B, and two lateral recesses $c$—$c$ corresponding to the flanges $d$—$d$ of the said fitting. The machine according to the invention has for its object to perform this work automatically and in a very accurate manner. On the other hand, the machine is so designed that the width and depth of the groove $a$ and of the recesses $c$ may be modified according to the size and shape of the heel and of the metal fitting used.

The machine which is represented by way of example in the drawings essentially comprises a frame 1 (Figure 5) upon which are mounted three stocks or heads 2—3—4, (Figures 4 and 8) each carrying a rotary cutting tool (milling cutter) 5—6—7, whose spindles are rotated by pulleys 8 or the like from any suitable power means (not shown). The central cutter 6, having a rounded outline, serves to cut the groove $a$, and the cutters 5—7 which are located at the sides and have a rectilinear cutting edge, serve to cut the lateral recesses $c$.

The frame 1 comprises vertical guides 10 on which is slidably mounted a carriage 11 to which is pivoted at 12 a supporting arm 13 whose top part is formed with a horizontal guide 14 in which is movable a slide 15 depending from a heel-carrying bracket 16, said slide 15 being held in place by plates 17 screwed to arm 13. The heel-carrying bracket 16 is formed, at its upper part, with a table adapted to receive the heel to be trimmed, at the level of the milling cutters 5—6—7.

The heel A is laid upside down and maintained upon a striated part of table 18 by three claws or points 19, mounted on a rod 20, slidable in a support 21 and urged downwardly by a spring 22; said support 21 is slidably mounted on an upright 23 secured to bracket 16, and may be maintained at the proper height by a set screw 24 or the like; rod 20 can be raised against the action of its spring 22 by a releasing lever 25.

For the exact centering of the heel upon the table 18 of bracket 16, said bracket carries two heel-centering strips or holders 30, each keyed to a vertical pivot pin 31, and having a hooked end (Fig. 13) adapted to hold the heel at its edges e (Fig. 2). On the vertical pins 31 are also keyed respective toothed sectors 32 which are in meshing engagement and are urged to the rear by a spring 33.

Carriage 11 is connected by a vertical rod 40, of adjustable length, to a pedal 41 (Figures 6 and 7) pivoted to frame 1. It is provided with a lug 42 traversed by a guiding rod 43 which is slidable in a guide 44 secured to frame 1; said rod is surrounded by a spring 45 which urges carriage 11 upwardly and is compressed when pedal 41 is depressed.

The support arm 13 has a lateral extension 50 to which is pivoted an actuating handle 51, connected by a link 52 to a pivot pin 53 mounted on the horizontal carriage 15 and extending through a horizontal elongated slot 54 in the support arm 13; said arm is normally held in the idle position by a rod 55, pivoted to frame 1 at 56 and extending through arm 13, a spring 57 being interposed between arm 13 and a nut 58, screwed to the end of rod 55. In the idle position of arm 13, its own weight tends to swing it outwardly, thus compressing spring 57.

It will be seen that the displacement of the actuating handle 51 will cause the movement of slide 15 and of the heel-carrying bracket 16 to bring the heel A successively in front of the three cutters 5—6—7. When one of said cutters is in contact with the front face of the heel A, the operator depresses pedal 41, in order to move the heel A vertically with reference to the cutter, thus cutting the desired groove or recess.

However, due to the tapered shape of the heel, said recesses must converge towards the base of the heel, so as to leave a sufficient thickness between the vertical edge e of the heel and the edge f of the recess, unto the lower part of the heel.

For this purpose, provision is made of suitable inclined guiding members, as shown in Figure 8. Below each milling cutter 5—6—7 is disposed a respective bronze guiding member 60—61—62; the left hand member 60 comprises a guiding slot 63 inclined downwardly to the left, as shown, and the right hand member comprises a guiding slot 64 inclined in the reverse direction. The central member 61 has a vertical guiding slot 65. Slide 15 carries three guiding rollers 66 (of which only one is shown in Fig. 5) adapted to successively engage the respective guiding slots 63—64—65; the inclination of the lateral slots 63—64 corresponds to the inclination which is to be given to the outer edges f of the recesses of the heel A, which inclination depends in turn upon the shape of the heel and of the metal fitting B.

By turning handle 51 to the right, while swinging said handle, together with arm 13, outwardly, about pin 12, the right hand roller 66 can be brought to the upper part of the inclined guiding slot 63 of the right hand member 60; the operator then depresses pedal 41, thus displacing roller 66 obliquely along the guide 63, and simultaneously moving slide 15 horizontally while it is lowered under the action of the pedal 41. The heel A which is disposed on bracket 16 comes into contact with the right hand cutter 5 at the same time as roller 66 engages the upper part of guide 63, and hence said heel will move, together with slide 15, relatively to cutter 5, so that the latter will form in the face of the heel a recess c whose inclination corresponds to that of the guiding member 60.

To prevent arm 13 from swinging to the front when the heel A is not exactly opposite one of the milling cutters, the guiding members 60 are provided with stop parts 69 which prevent the inward displacement of the guiding rollers 66 when said rollers are exactly opposite their respective guides.

As above stated, the central guiding member 61 extends vertically and its side walls are preferably slightly inclined (Figure 10) so as to automatically centre the middle roller 66ª, should it not be exactly centered when the operator pushes handle 51 to the front. To further facilitate this centering, the horizontal slide 15 is formed with a notch 70 cooperating with a spring latch 71 mounted on support arm 13. Said latch enters its notch when the heel A is exactly opposite the central cutter 6. By slightly pushing lever 51 to the right or left, slide 15 will clear said latch 71.

The guiding members 60—61—62 are obviously adjustable in position, and for instance they are slidably mounted in guides 72 (Fig. 8) formed in frame 1, their position being adjusted by means of screw 73. If desired means may also be provided for the vertical adjustment of said guiding members.

The stocks or heads 2—3—4 carrying the milling cutters are preferably adjustable in all directions, and chiefly to the front and rear.

The shaft 80 of each milling cutter extends preferably through an aperture 81, of sufficient size, formed in a milling cutter guide 82 (Figures 11 and 12) mounted in a vertical guiding slot 83 formed in a member 84, which is slidable in a slot 85 of frame 1. Said cutter guide 82 may thus be adjusted vertically and horizontally so as to accurately regulate the depth of the grooves or recesses upon the vertical, horizontal, and curved parts of the heel, this depth being determined by the contact of the guide 82 with the heel. As shown in Figure 12, the edge 86 of the guide 82 in contact with the face of the heel A is preferably bevelled at an angle corresponding to the inclination of the front face of the heel towards the middle.

The operation of the said machine is as follows:

The operator places the heel A in an inverted position on table 18, with the face of the heel towards the milling cutters, and he then pushes the heel forward between the two centering holders 30, while pressing upon the releasing lever 25 so as to raise rod 20. Since the two holders 30 are connected together by the toothed sectors 32, they assure the exact centering of the heel upon the table 18. After the heel has thus been put in place, the releasing lever 25 is allowed to return, the claws 19 thus entering the heel to secure the latter firmly in position, this being facilitated by the striated part of table 18. The machine being set running, handle 51 is moved to the left (or to the right, as desired) so as to bring the left hand roller 66 into the left hand guiding member 60, at the same time pushing the said handle forwardly. Due to this forward motion, the face of the heel A engages cutter 5 which begins to cut the recess c.

The operator then depresses pedal 41 in order to move the heel obliquely in front of the milling cutter. When the pedal has been fully depressed (the stroke being regulated by the adjustable rod 40), the operator moves roller 66 out of the left hand guiding member 60 by pulling on handle 51 outwardly; he brings said handle 51 to the right until latch 71 engages notch 70 of slide 15, while releasing pedal 41, whereby spring 45 will raise carriage 11, arm 13, etc. He then pushes handle 51 to the front, thus bringing the guiding roller 66 into the central guiding slot 65.

The central cutter 6 will now cut the middle groove a; by a like operation, the right hand recess c is formed by the right hand cutter 7.

Obviously, the invention is not strictly limited to the details of construction hereinbefore specified, and the machine is susceptible of numerous modifications without departing from the principle of the invention.

Having now described my invention what I claim as new and desire to secure by Letters Patent is:

1. A machine for cutting grooves in the front face of shoe heels, comprising three rotary cutters, a central cutter for cutting a central groove in said heel and two side cutters for cutting lateral recesses merging into said groove, a support for maintaining the heel, means for displacing said support for bringing the heel adjacent said cutters, successively, means for displacing said support toward and away from said cutters, and means for displacing said support obliquely with respect to said side cutters and tangentially with respect to said central cutter.

2. A machine for cutting grooves in the front face of shoe heels, comprising cutting means, a frame, a vertically movable carriage slidably mounted on said frame, means for operating said carriage, an arm pivoted to said carriage and movable toward and away from said cutting means, a horizontally movable slide slidably carried by said arm, means for moving said arm and slide, means for guiding said slide obliquely with respect to said cutting means, and means carried by said slide for holding a heel thereon.

3. A machine for cutting grooves in the front face of shoe heels, comprising three rotary cutters, a central cutter for cutting a central groove in said heel and two side cutters for cutting lateral recesses merging into said groove, a support for maintaining the heel, means for displacing said support for bringing the heel adjacent said cutters, successively, means for displacing said support toward and away from said cutters, means for urging said support vertically, a vertical guiding member associated with said central cutter, oppositely inclined guiding members associated with said side cutters, respectively, and means on said support, adapted to cooperate with said guiding members, respectively.

4. In a machine as claimed in claim 1 a spring controlled latch for opposing a resistance to the movement of said support past said central cutter, in either direction.

5. A machine as claimed in claim 3 wherein said central guide has inclined faces for centering said last-named means in the inward movement thereof.

6. In a machine as claimed in claim 3; stop members associated with said guiding members for preventing the inward movement of said last-named means, when the latter are not presented exactly in front of said guiding members.

7. In a machine as claimed in claim 2, a rod pivoted to said frame and extending loosely through said arm and resilient means on said rod adapted to be deformed under the weight of said arm when the latter is allowed to freely pivot upon said carriage.

8. In a machine as claimed in claim 2, means for yieldingly urging said carriage upwardly.

9. In a machine as claimed in claim 3, means for adjusting the position of said cutters and guiding members.

10. In a machine for cutting grooves in the front face of shoe heels, cutting means, support means for the heel including a supporting table, two holders mounted above said table and means for yieldingly urging the free ends of said holders toward one another, a spring controlled rod having points adapted to be elastically pressed against the base of the heel laid on said table, and means acting against said spring for releasing said points.

In testimony whereof I have signed my name to this specification.

GEORGES ADOLPHE VICHERD.